June 4, 1946.  L. M. SHERMAN  2,401,376
TORQUE CONVERTER AND CONTROL SYSTEM
Filed June 18, 1943   5 Sheets-Sheet 1
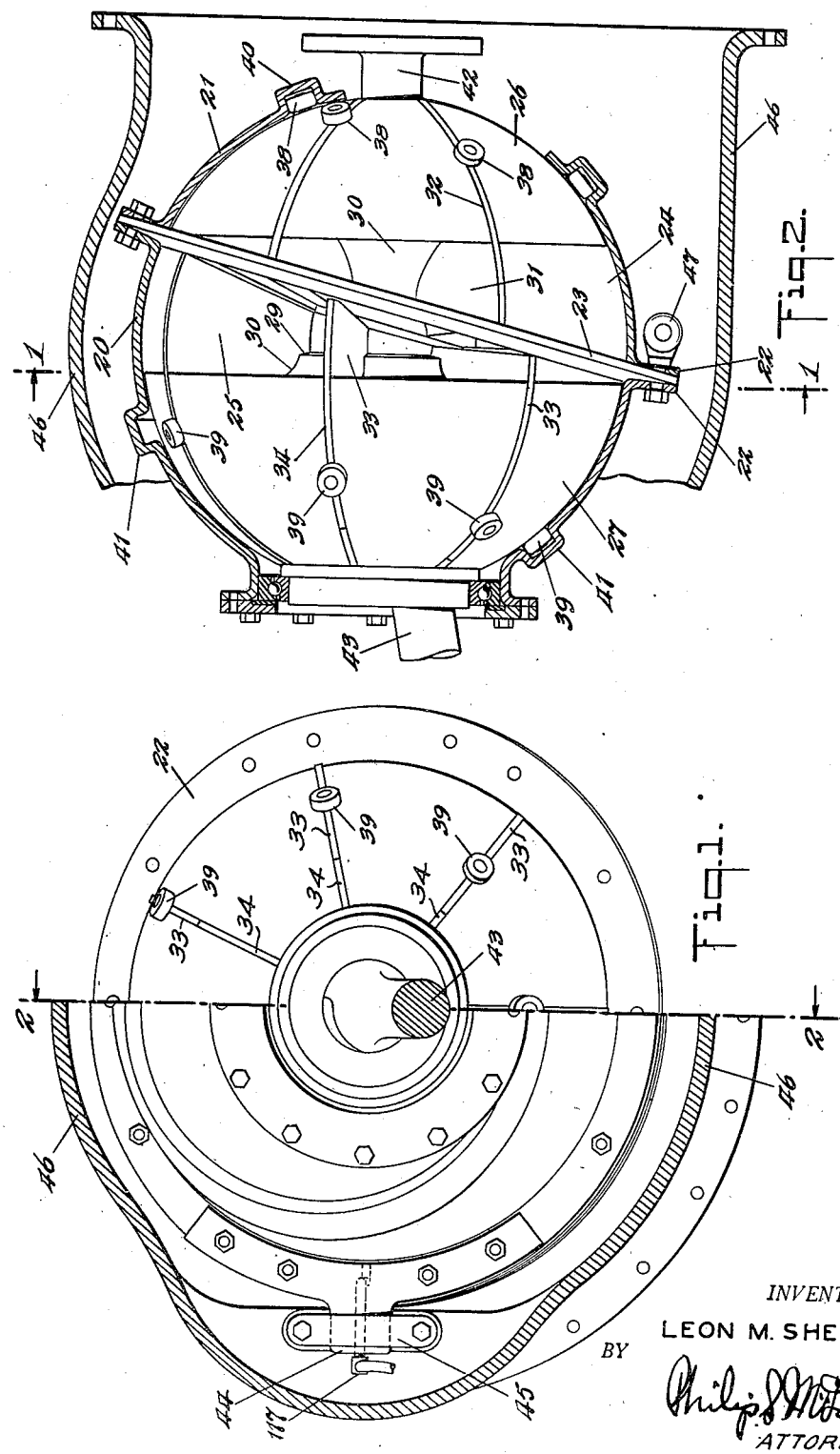
INVENTOR.
LEON M. SHERMAN
BY
Philip S. McLean
ATTORNEY

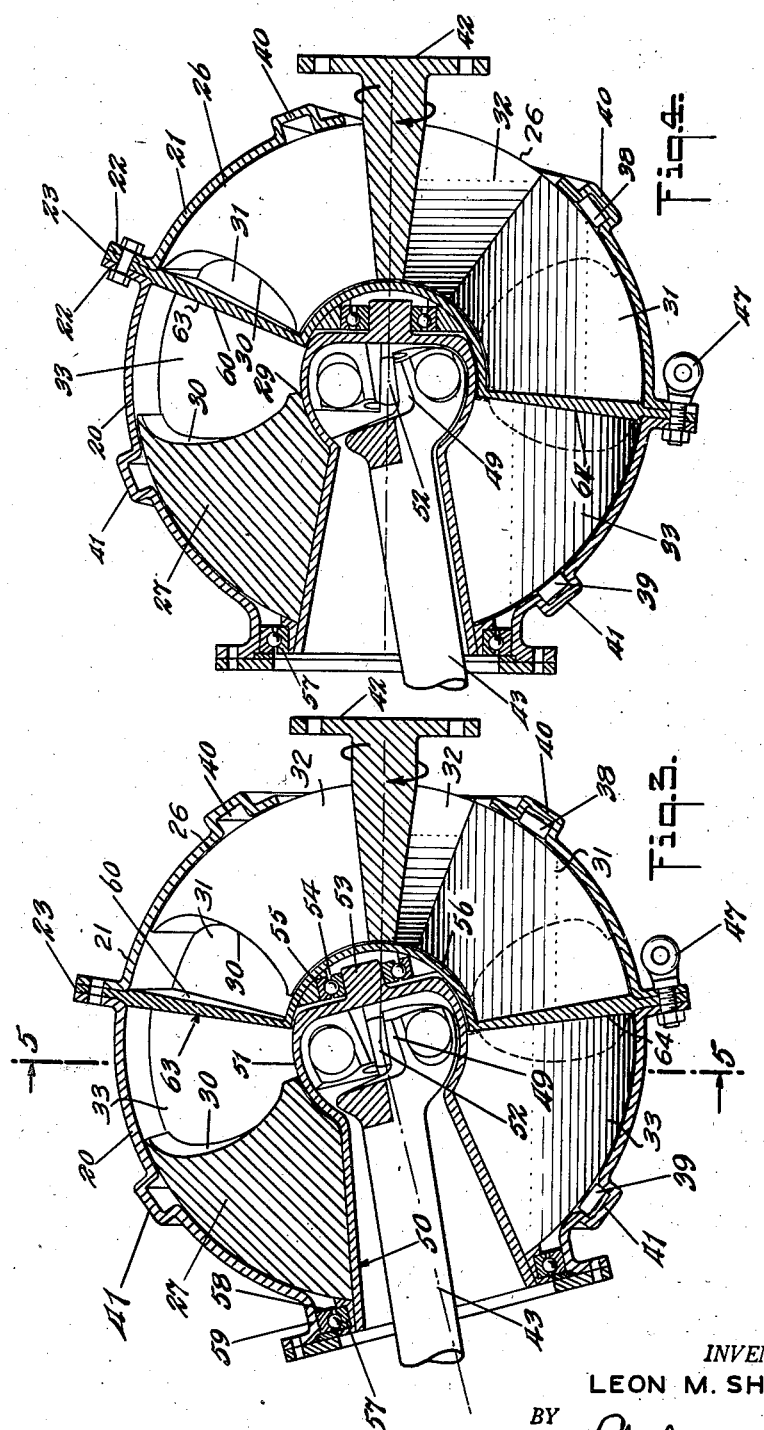

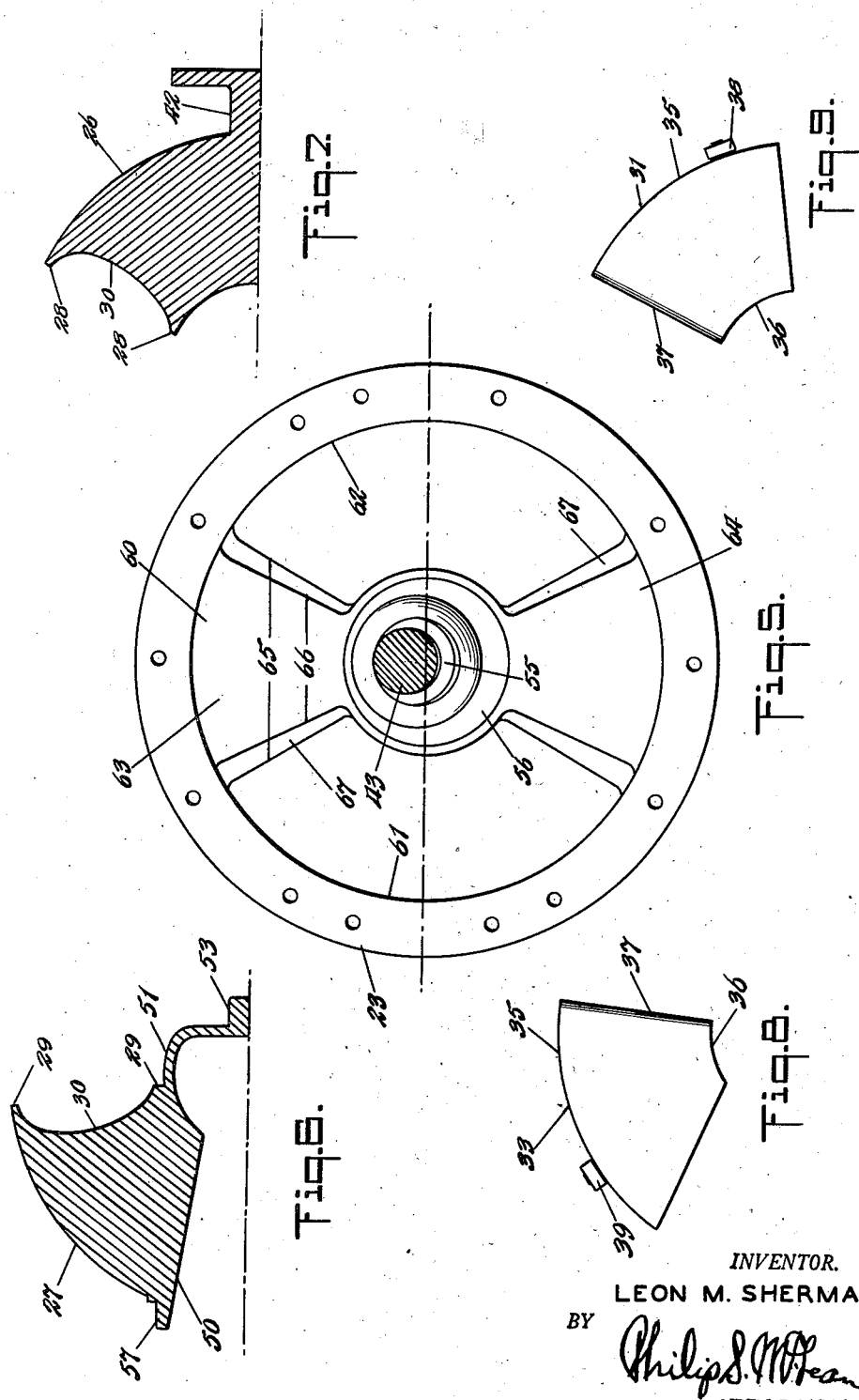

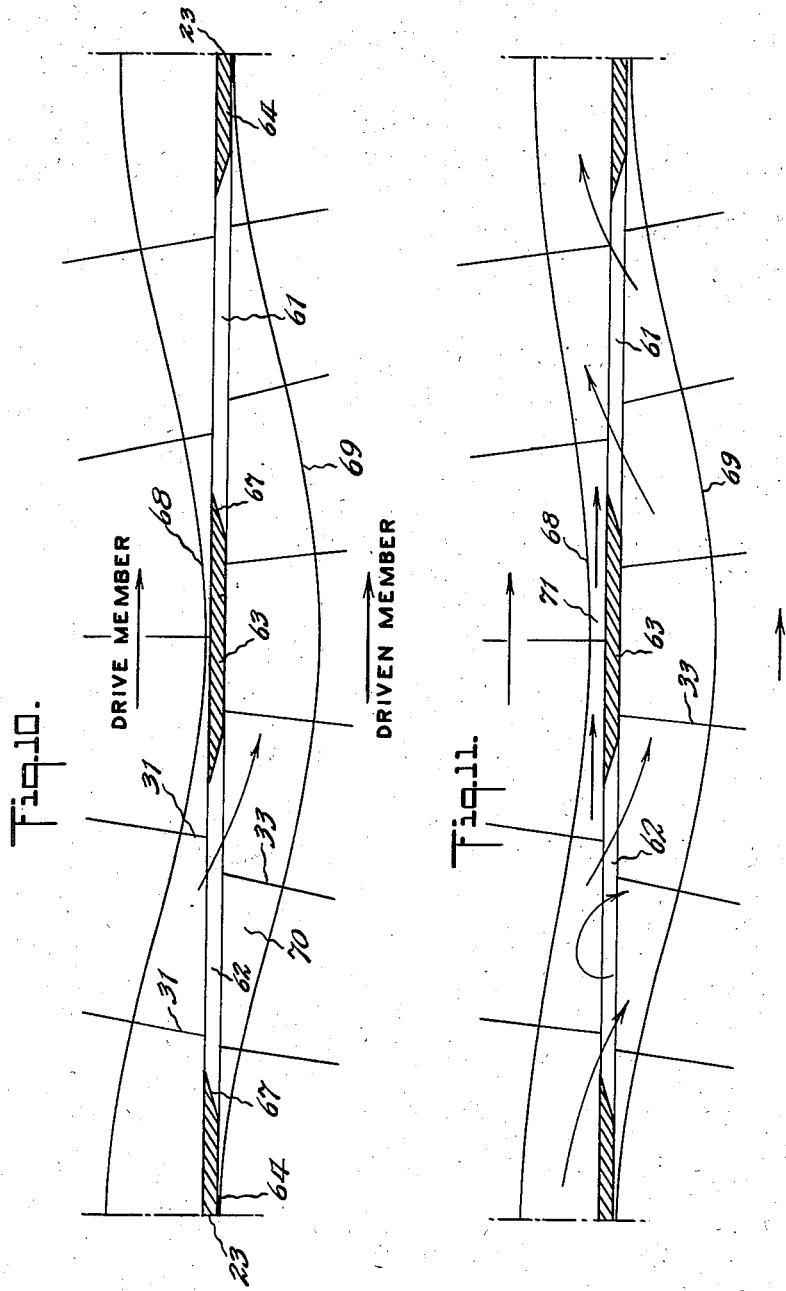

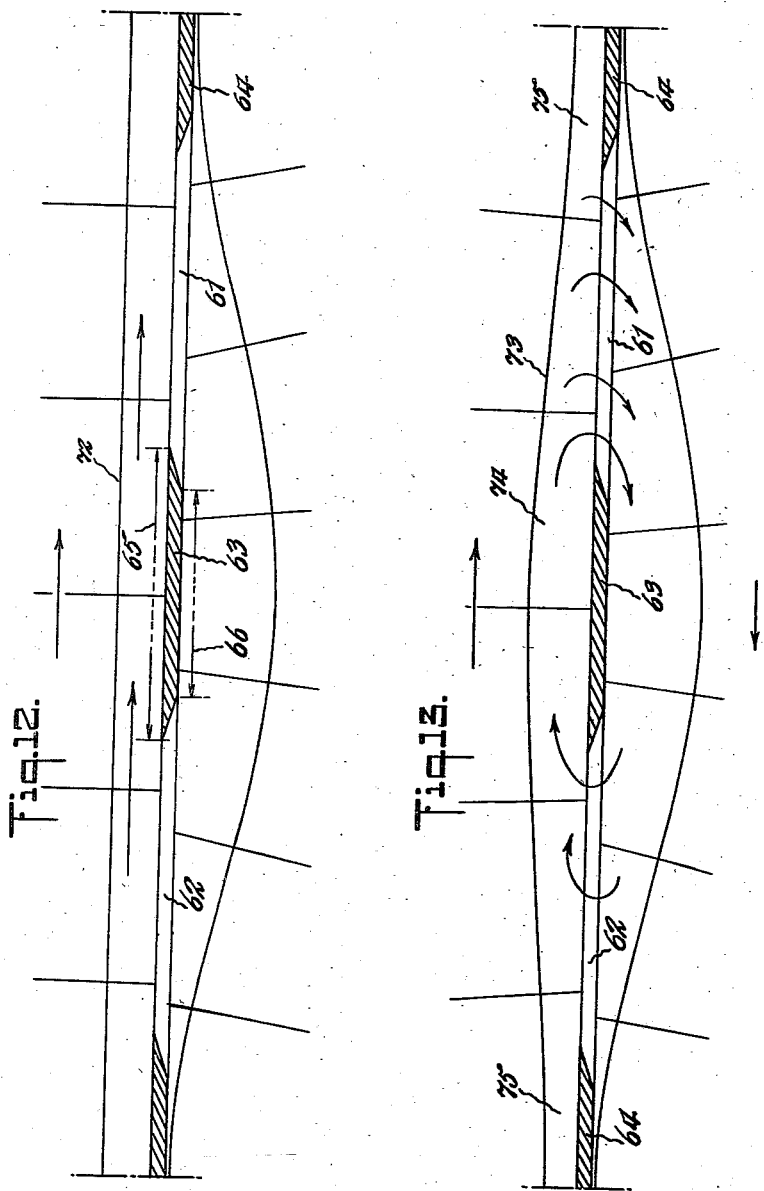

Patented June 4, 1946

2,401,376

UNITED STATES PATENT OFFICE 2,401,376

TORQUE CONVERTER AND CONTROL SYSTEM

Leon M. Sherman, Packanack Lake, N. J.

Application June 18, 1943, Serial No. 491,421

22 Claims. (Cl. 60—53)

1

The invention herein disclosed relates to torque converters and to the control of the same.

Particularly, the present invention is concerned with the driving of motor vehicles and with other installations where speed reducing power transmission is required.

Special objects of the invention are to provide for an infinite change of speed ratios and to effect the utilization of such ratios always to the best advantage or greatest efficiency.

For the torque conversion, a novel hydraulic unit, comprising a vane type pump of variable displacement discharging directly into a similar element of fixed displacement is provided and the most efficient control is effected by a vehicle speed governor and an engine speed governor combined with an effective power curve cam to vary the setting of the converter unit in accordance with power requirements, as expressed for example, by the pressure on an accelerator pedal or the like.

The details of construction and the many other objects and advantages of the invention are set forth or will appear in the course of the following specification.

The drawings accompanying and forming part of the specification illustrate a present practical embodiment of the invention, but structure and operational features may be modified and changed in various ways, all within the true intent and broad scope of the invention, as hereinafter defined and claimed.

Figs. 1 and 2 in the drawings, are broken transverse and longitudinal sectional views respectively of the torque converter unit, Fig. 1 appearing as on substantially the plane of line 1—1 of Fig. 2 and Fig. 2 appearing as on substantially the plane of line 2—2 of Fig. 1.

Figs. 3 and 4 are substantially central longitudinal sectional views as on line 2—2 of Fig. 1, showing the converter in neutral and in full forward driving relation respectively.

Fig. 5 is a view of the partitioning member of the converter casing, as appearing on the line 5—5 of Fig. 3.

Figs. 6 and 7 are longitudinal half sections of the spherical segments constituting the driven and the driving elements respectively.

Figs. 8 and 9 are plan views respectively of vanes forming parts of the driven and the driving elements.

Figs. 10, 11, 12 and 13 are diagrammatic views illustrating operation of the torque converter, Fig. 10 indicating full forward, Fig. 11 an intermediate forward position, Fig. 12 neutral and Fig. 13 reverse drive operation.

In the particular embodiment here illustrated,

2 the torque converter comprises a spherically chambered housing made up of complementary spherical sections 20, 21, having complemental edge flanges 22, bolted together over the edge of a transverse, diametrically disposed plate or partition 23, dividing the chamber into driving and driven compartments 24, 25.

Disposed within the two compartments are the spherical segments 26, 27, in sealing engagement with the surrounding spherical wall of the chamber and having inner conically disposed faces 28, 29, Figs. 6 and 7, opposed to correspondingly conical opposite face portions of the diaphragm or partition. These conically disposed end faces of the segments are shown as recessed or concaved at 30, to provide for better control of fluid flow and exposure of greater surface area of vanes operating in these elements.

The vanes referred to are shown as flat segmental blades 31, sliding in radial, longitiudinally extending slots 32, in the driving segment 26, and generally similar segmental blades 33, sliding in like slots 34, in the driven segment 27.

As shown in the detail views, Figs. 8 and 9, these segmental blades or vanes have concentrically curved outer and inner edges 35, 36, to fit the enclosing spherical wall of the chamber and spherical guide surfaces at the center of the chamber and rounded radially extended edges 37, to cooperate with the opposite faces of the partition.

To compel the blades to closely follow and cooperate with opposite faces of the partition, they are shown as provided with rollers 38, 39, on their outer edges riding in annular grooves or trackways 40, 41, in the casing at opposite sides of and parallel with the partition.

The driving segment 26, is shown as carried by and possibly forming an integral portion of the driving shaft 42.

The driven shaft, indicated at 43, is connected with the driven segment 27.

In the present disclosure, the spherically chambered casing is provided with transversely extending horizontally disposed trunnions 44, Fig. 1, journalled in bearings 45, in a stationary enclosing and supporting housing 46, and is provided with means, as represented by eyebolt 47, by which it may be rocked on its trunnions to vary the displacement effect of the driving member of the converter. In practice, a power cylinder or some other power means may be employed to effect these speed ratio changing adjustments and pawl and ratchet or some such holding means be used to secure the casing in any position of adjustment.

With the driven shaft operating in a fixed angular relation to the drive shaft and the housing rocking on a transverse axis, as in the case illustrated, a universal joint coupling, such as the ball type universal indicated at 49, is provided between the driven sector 27 and shaft 43. This universal coupling as shown in Figs. 3 and 4, has as its center, the center of the spherical chamber, so as to provide a constant drive relation, regardless of the angled position of the housing.

To accommodate the shaft end and coupling, the driven segment is shown as having a conical passage 50, opening inward through the outer end of the same, terminating in a hollow spherical portion 51, based on the common center 52. This central spherical portion provides at the outside a guide over which the curved inner edges 36, Fig. 8, of the driven blades ride and at the inside a chamber containing, and to which the drive poration of, the universal coupling is anchored.

The driven sector 27, carrying the universally coupled inner end of the driven shaft 43, is journalled in the partition member 23 by means of an axially extending stud 53, on the inner spherical portion 51, operating in an anti-friction bearing 54, seated in a cavity 55, in the central spherically chambered portion 56, of the partition. This spherical portion is shown as based on the same common center 52, and as receiving the spherical hub portion 51, of the driven member at the inside and as forming a guide at the outside for the inner curved edges 36, of the drive blades 31.

The axial tubular portion 50, of the driven member is shown provided with an external annular shoulder 57, for an anti-friction bearing 58, seated in the annular extension or neck portion 59, of the housing.

The partition is shown as dished on the side toward the driving member to provide an annular conical wall portion 60, for cooperation with the sliding vanes at opposite sides of the same.

The partition is ported at diametrically opposite points on the line of the trunnion axis and to provide maximum free flow, these ports are shown in Fig. 5, as extended segmental openings 61, 62, leaving only smaller segmental closed portions 63, 64, between the same, at the top and bottom of the partition.

The closed parts 63, 64, of the partition should be at least as extended as the spacing between the vanes. If the vanes are of the same number and spacing at opposite sides, the port openings and hence the closed portions may be of equal extent at both sides of the partition.

To avoid periodic vibrational effects, a different number and spacing of the vanes may be provided at the opposite sides of the partition and, in such a case, it is preferred to have the greater number of vanes on the driven member. Thus in the illustration, the driving member 26 carries six equally spaced vanes 31, and the driven member 27, seven equally spaced vanes 33. The segmental closed portions 63, 64, then are made wider at the driving side, where the blades are more widely spaced, as represented by dimension line 65, Fig. 5, and of less angular extent at the driven side as represented by line 66, the edges of the port openings being bevelled as indicated at 67, to provide these differences in area at opposite sides of the partition.

Torque converter operation

While operation of the converter will generally be clear from an understanding of the structure as outlined above, the action may be more fully appreciated by reference to the operational diagrams, Figs. 10 to 13.

In Fig. 10, the full forward driving relation of the parts, is indicated, this view illustrating the action taking place with the parts in the Fig. 4 position with the housing rocked on its trunnions, that is, about the center point 52, in a clockwise direction. This adjustment of the housing brings the closed upper portion 63, of the partition close over toward the opposing end face 28, of the driving member, here shown by the sine curve 68, representing travel of that face in a single revolution of the drive member. This same adjustment carries the lower closed portion 64 of the partition away from the opposing end face of the drive member as indicated at the ends of this view. The sine curve 69, represents travel of the end face of the driven member and, in this view, parallels curve 68, providing a wide sine channel 70, for flow of the oil or other drive medium from the drive member through port 62, into the buckets of the driven member and back through port 61, into the driving member. The blades 31 and 33 of the driving and driven members are here represented by single lines showing how, in a relative sense they slide in and out in their slots as the members rotate.

Actually, because of the annular guide tracks 40, 41, being parallel with the partition, the blades of both driving and driven members rotate in true circular paths and hence in balance at all times. Similarly, the spherical segment on the drive shaft is symmetrical and in balance at all times. The driven spherical segment is supported by and rotates concentrically within the stationary housing.

The continuous flow described utilizes both hydrokinetic and hydrostatic transfer of energy from the driving to the driven member.

Fig. 11 illustrates an adjustment at less than full forward driving relation, with the closed portion 63 at the top of the partition backed away from the face 28 of the driving segment, represented by line 68, to leave a clear channel 71, at the top between the partition and face of the driver through which a portion of the fluid may flow, instead of passing through port 62, against the vanes 33, of the driven member. The driven member being of constant displacement, the curve 69 representing the face of that member remains the same.

Fig. 12 represents the condition illustrated in Fig. 3, with the housing rocked back to a neutral position, with the face of the driving member an equal distance from the partition all the way round. In such case, the sine curve 68, flattened at its peaks, Fig. 11, becomes then a substantially straight line 72, with the blades projecting equally all the way round and hence carrying the liquid around in a circular path without creating any effective displacement against the blades of the runner or driven member.

Fig. 13 illustrates the "reverse" position of the parts, in which the housing is backed away beyond the "neutral" position illustrated in Fig. 3, in a counterclockwise direction, producing the effect represented by curve 73, that is, enlargement of the active flow channel at 74, between the face of the drive member and closed portion 63, of the partition and contraction of the channel at 75, between the drive member and closed portion 64. This creates the counterflow indicated against the blades of the driven member, producing low speed reverse rotation of the latter.

The modified toric shape of the cavity formed between the driving and driven members provides a fluid path resembling that provided in hydrokinetic couplings. This flow path is in the form of a helix, the central axis of which is the circumference of a circle.

The fluid in the chambers of the driving element acquires an outward radial velocity over the curved face of the driving member and is accelerated in a circumferential direction, thus acquiring kinetic energy. This fluid leaves the driving element at high velocity and passing through the open port in the partition impinges upon the vanes of the slower moving driven element. Continuing in its helical path inwardly over the curved surface of the driven member, it imparts to this driven elements its kinetic energy, at the same time losing velocity.

The fluid then reenters the driving element through the other open port at lowered velocity to repeat the cycle.

Thus transfer of maximum kinetic energy is effected, with avoidance of cavitation and vortex losses and wasteful turbulence. The invention by this special combination utilizes in a hydrostatic converter the advantageous principles employed in hydro-kinetic couplings.

While the structure disclosed provides a practical compact unit applicable to many commercial purposes, it is realized that the construction possibly may require modification to suit special needs or uses. In some cases, it may be considered best to keep the housing stationary and shift the drive shaft to vary the angular relation between the driving member and the ported partition and it is intended that this or other inversion of parts be considered as coming within the scope of the invention and covered by the claims.

The guide tracks 40, 41, by holding the blades in circular paths of rotation, lined up in cooperative relation with opposite faces of the partition, enable the ports to be made wide open, that is, to the fullest possible extent, so as to freely pass the liquid through from the high pressure to the low pressure side, thus to utilize all kinetic energy to the fullest possible extent. It is realized however, that instead of using positive guide tracks, the blades may be simply spring pressed toward the partition, in which event, it may be desirable to bridge the ports to support the blades in their travel thereacross. Many other such changes may be suggested by the particular requirements to be met and which also would come within the broad scope of the invention.

The torque converter combined with the control system provides better performance and greater fuel and oil mileage. The motor is governed at all times along a predetermined power curve chosen for greatest motor efficiency. The vehicle is operated with the converter at the proper ratio for best efficiency, yet peak power is always instantly available. The controls will maintain the desired vehicle speed under all road conditions, without change in position of the accelerator or indicator pedal. With proper choice of final drive ratio, the motor will never operate "over the peak" even at top vehicle speed.

A smaller motor may be used than with conventional installations, because of the fact that peak power is always instantly available for acceleration. This motor need only be large enough so that peak power will drive the vehicle at the desired top speed or so that peak power will give the desired acceleration, whereas heretofore, it has been necessary to install larger motors to get the required power for acceleration at less than peak motor speeds.

When but little power is required to maintain the desired vehicle speed, the motor will be operated at the speed at which it delivers that power most efficiently.

Gear shifting is eliminated but the driver still retains the sensation of control and is able to exercise his own skill and judgment.

Because of the factors of greater efficiency and better performance, the invention is particularly important for such vehicles as trucks, tractors and tanks, buses having rear drive motors with remote control and operating with frequent stops and starts, and the like.

What is claimed is:

1. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with the surrounding wall of said chamber and with opposite sides of said partition.

2. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, there being a greater number of said vanes in the driven segment than in the driving segment.

3. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said driven segment being journalled in said spherical chamber at one side of the partition and a drive shaft supporting the driving segment in the spherical chamber at the opposite side of the partition.

4. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said segments having slots slidingly receiving said vanes and means for urging said vanes in said slots into cooperative relation with the opposite sides of the partition.

5. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said segments having slots slidingly receiving said vanes, means for urging said vanes in said slots into cooperative relation with the opposite sides of the partition and including circular tracks in the housing at opposite sides of the partition and members carried by the vanes engaged with said tracks.

6. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said segments having slots slidingly receiving said vanes, means for urging said vanes in said slots into cooperative relation with the opposite sides of the partition and including circular tracks on the housing and members on the vanes engaging said tracks, said tracks being disposed in planes substantially parallel with the opposite faces of said partition.

7. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, the driven segment having a tubular reentrant portion extending to the center of the spherical chamber, a driven shaft located in said tubular portion and a universal joint coupling between said driven segment and shaft located at the center of said chamber.

8. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, an enclosure about said housing and means for returning liquid from within said enclosure into the chamber through the trunnion mounting of the housing.

9. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said segments having oppositely inclined faces opposed to the opposite sides of the partition.

10. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said segments having circularly concaved end faces opposed to the opposite sides of said partition.

11. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said partition having closed areas between the ported portions and of an extent equal to the spacing between the vanes cooperating therewith.

12. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition and means for rocking said trunnioned housing to vary the angular relation between said partition and the driving segment.

13. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said partition having a central spherical portion and an annular conical portion opposed to said driving and driven segments.

14. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said partition having a central spherical portion and an annular conical portion opposed to said driving and driven segments, the driving segment being opposed to the dished side of said conical partition and the driven segment being opposed to the flaring side of said partition.

15. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said partition having a central spherical portion and an annular conical portion opposed to said driving and driven segments, a bearing in said spherical central portion of the partition and the segment at that side of the partition being journalled in said bearing.

16. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said partition having a central spherical portion and an annular conical portion opposed to said driving and driven segments, a bearing in said spherical central portion of the partition and the segment at that side of the partition being journalled in said bearing and an outer bearing for said segment disposed between the outer portion of said segment and a surrounding portion of the housing.

17. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said partition having a central spherical portion and an annular conical portion opposed to said driving and driven segments, a bearing in said spherical central portion of the partition and the segment at that side of the partition being journalled in said bearing, a shaft and a universal joint connection between said shaft and said segment and located centrally of the housing.

18. A torque converter, comprising a spherically chambered housing trunnioned on a transverse axis and provided with a transverse partition ported at diametrically opposite points in line with the trunnion axis, driving and driven spherical segments in said chamber at opposite sides of said partition and movable vanes in said segments in cooperative relation with opposite sides of said partition and portions of the surrounding wall of the spherical chamber adjoining said partition, said partition having a central spherical portion and an annular conical portion opposed to said driving and driven segments, a bearing in said spherical central portion of the partition and the segment at that side of the partition being journalled in said bearing and said segment having a central spherical hub portion complementary to the central spherical portion of the partition.

19. A torque converter, comprising a spherically chambered housing having a transverse partition ported at diametrically opposite points, spherical segments rotatable in the spherical chamber of said housing at opposite sides of said partition, vanes slidably mounted in said segments and in cooperative relation with opposite sides of said partition and portions of the surrounding wall of the spherical chamber adjoining opposite sides of the partition and means for effecting relative angular adjustments of said housing and one of said spherical segments about the center of said spherical chamber.

20. A torque converter, comprising a spherically chambered housing having a transverse partition ported at diametrically opposite points, spherical segments rotatable in the spherical chamber of said housing at opposite sides of said partition, vanes slidably mounted in said segments and in cooperative relation with opposite sides of said partition and portions of the surrounding wall of the spherical chamber adjoining opposite sides of the partition and means for effecting relative angular adjustments of said housing and one of said spherical segments about the center of said spherical chamber and driving and driven shafting connected respectively with said spherical segments.

21. A torque converter, comprising a spherically chambered housing trunnioned on a transverse axis and provided with a transverse partition ported at diametrically opposite points in line with the trunnion axis, driving and driven spherical segments in said chamber at opposite sides of said partition, vanes movably mounted in said segments for cooperative relation with opposite sides of said partition and portions of the surrounding wall of the spherical chamber adjoining said partition, one of said segments having a passage extending from the center of the spherical chamber and opening out through the side of the housing, a shaft disposed in said passage and a universal coupling between said segment and shaft, said universal coupling having as its center the center of the spherical chamber.

22. A torque converter, comprising a spherically chambered housing having a transverse partition ported at diametrically opposite points, spherical segments rotatable in the spherical chamber of said housing at opposite sides of said partition, vanes slidably mounted in said segments and in cooperative relation with opposite sides of said partition and portions of the surrounding wall of the spherical chamber adjoining opposite sides of the partition and means for effecting relative angular adjustments of said housing and one of said spherical segments about the center of said spherical chamber, there being a greater number of vanes in one of said segments than in the other and said partition having closed areas between the ports of a width at each side of the partition substantially equal to the spacing between the vanes at that side of the partition.

LEON M. SHERMAN.